US 6,534,760 B2

(12) United States Patent
Mueller et al.

(10) Patent No.: US 6,534,760 B2
(45) Date of Patent: Mar. 18, 2003

(54) ARRANGEMENT FOR THE TEMPERATURE-COMPENSATED MULTI-DIMENSIONAL MICROPOSITIONING OF MUTUALLY POSITION-DEFINED OPTICAL COMPONENTS

(75) Inventors: Klaus-Dieter Mueller, Karlsruhe (DE); Harry Marth, Waldbronn-Etzenrot (DE)

(73) Assignee: Physik-Instruments (PI) GmbH & Co. KG, Waldbronn (DE)

( * ) Notice: Subject to any disclaimer, the term of this patent is extended or adjusted under 35 U.S.C. 154(b) by 0 days.

(21) Appl. No.: 09/880,014

(22) Filed: Jun. 14, 2001

(65) Prior Publication Data
US 2002/0017601 A1 Feb. 14, 2002

(30) Foreign Application Priority Data
Jun. 14, 2000 (DE) .......................... 100 29 306

(51) Int. Cl.$^7$ .................................. H01J 5/16
(52) U.S. Cl. ........................ 250/216; 250/239
(58) Field of Search ................ 250/216, 239; 359/236, 230

(56) References Cited
U.S. PATENT DOCUMENTS 4,893,071 A * 1/1990 Miller ....................... 324/660
5,438,206 A * 8/1995 Yokoyama et al. ......... 356/450

OTHER PUBLICATIONS

Glöckner, Göring, Götz, and Rose, "Piezoelectrically driven micro–optic fiber switches", Optical Engineering vol. 37, No. 4, Apr. 7, 1998, pp. 1229–1234.*

* cited by examiner

Primary Examiner—Stephone B. Allen
Assistant Examiner—Stephen Yam
(74) Attorney, Agent, or Firm—Oblon, Spivak, McClelland, Maier & Neustadt, P.C.

(57) ABSTRACT

An arrangement for a temperature-compensated multi-dimensional micropositioning of mutually position-defined optical components including a guide unit for housing the optical components and a plurality of piezo actors. The guide unit includes two spaced plates or rings. Also included is three equally spaced solid joints arranged or integrated between the rings or plates, and stack-type piezo actors secured in a neighbouring relationship with the solid joints in such a manner that actuation forces act on the rings or plates. Further, at least the surfaces of the rings or plates accommodating the optical components are coated with a material corresponding to that of the optical components, the guide unit and the optical components are made from materials with essentially the same temperature coefficients, and one stack-type piezo actor is arranged between two solid joints.

9 Claims, 2 Drawing Sheets

ARRANGEMENT FOR THE TEMPERATURE-COMPENSATED MULTI-DIMENSIONAL MICROPOSITIONING OF MUTUALLY POSITION-DEFINED OPTICAL COMPONENTS

BACKGROUND OF THE INVENTION

1. Field of the Invention

The invention relates to an arrangement for the temperature-compensated multi-dimensional micropositioning of mutually position-defined optical components, comprising a guide unit for housing the optical components as well as several piezo actors.

2. Discussion of the Background

With Fabry Perot interferometers it is known to utilise multiple reflections in a gaseous medium with a constant refractive index, with the gaseous medium being enclosed by two permeable plates which are metal-coated on one side and aligned parallel to each other. It is between the two mirror plates, where the mentioned evaluable multiple reflections occur. Depending on the mirror distance, a constructive interference and transmission takes place for one wavelength only. In this manner it is possible to investigate a wavelength range of a few nanometers, the so-called free spectral range, with a very small motion of the mirror plates towards each other, and thus determine even the most minute displacements or increases of individual spectral lines. The mirror plate distance can be adjusted in a more or less controlled manner by means of piezo elements.

From Optical Engineering Vol. 37, No. 4, Apr. 7, 1998, pages 1229 to 1234, various piezoelectric actors for optical applications are known. For example, a so-called piezo actor of the stack type is presented therein, which consists of a stack arrangement of individual elements connected in series. It is possible with such stack-type actors to realize relatively large adjustment travels. For a two-dimensional adjustment cylindrical actors or actors arranged in parallelogram shape are of the related art, while for the detection of the current position the integration of preferably optical sensors is also known, in order to enable a controlled piezo motion, in particular with optical systems.

It was found, however, that the previously introduced length-variable actors consisting of guide unit and piezo drive do not adequately meet the special requirements, in particular with respect to the necessary temperature stability and temperature independence. An improvement of the tilt, wear, and clearance-free motion of optical components relative to one another is generally achieved only with a prohibitive cost increase which leads to considerably higher costs of measuring and test equipment to be manufactured.

SUMMARY OF THE INVENTION

Based on the above, it is therefore the object of the invention to specify an advanced arrangement for the temperature-compensated multi-dimensional micropositioning of mutually position-defined optical components, by means of which a particulary economic mechanical guide system can be presented which is of a simple construction and thus technologically feasible in an easy manner.

Accordingly, the basic idea of the invention is to realise the guide unit of the arrangement for the temperature-compensated multi-dimensional micropositioning of optical components, from two spaced plates or rings, with several spaced solid joints being arranged between the rings or plates. The solid joints can be integrated in bolt-type connection means of the guide unit or comprise same. The guide unit with plates, bolts and/or solid joints can be formed both by joining together several individual components and in a monolithic manner, i.e. integrally.

Piezo actors are secured in a neighbouring relationship with the solid joints or bolts, respectively, in such a manner that actuation or positioning forces, respectively, can be made to act on the rings or plates.

At least the surfaces of the rings or plates accommodating the optical components, i.e. the outer end faces, are coated with a material corresponding to that of the optical components, with the coating being able to be machined in a suitable manner prior to snapping-on the optical components for a definite positional definition. According to the invention, the guide unit and the optical components are made from materials with essentially the same temperature coefficients. The material if the guide unit is preferably Invar, and the material of the optical components is quartz or quartz glass, respectively. The coating is also realised from quartz, e.g. by sputtering or vapour deposition or similar coating methods. The coating layer may be machined in a suitable manner, e.g. polished, for maintaining the desired mutual positions of the optical components.

The inner surfaces of the plates or rings comprise several distributed conductive areas each of which forming capacitive sensors for the detection of location and/or positional variations of the plates or the optical components, respectively, attached thereon.

In an embodiment of the invention, the plates or rings each have an essentially central opening or through-hole, with the respective rear side or an integral extension of the optical component covering or passing the opening. At the rear side or the face of the extension, several distributed conductive areas are arranged which, together with the opposite areas form capacitive range sensors each, so that a control loop for controlling the piezo actors can be realised in a simple manner.

The circumference of the guide unit preferably comprises three equally spaced solid joints or bolts comprising such joints, with one piezo actor each being arranged between two solid joints or bolts, respectively.

As already mentioned, control signals for the operation of the piezo actors can be derived from the location and positional variation values of the capacitive sensors, so that the desired actuation position can be maintained or a new position can be adjusted upon feedback.

The solid joints and piezo actors are preferably arranged or secured in an alternating manner spaced by 120° between the plates or rings. The capacitive sensors or sensor areas, resspectively, are also designed to be spaced by essentially 120° each, with associated areas representing a measuring capacitor being arranged opposite to one another.

As the piezo actors, piezo stack arrangements can be used wich are individually controllable.

All materials employed are adapted to one another in such a manner that upon temperature influences on the actor unit no changes in distance of the optical components from each other occur. The connection between the guide unit and the optical parts or components can be realised for example by a sputtered layer, with this layer consisting of the material of the optical components themselves. The applied connecting layers can be high-precision ground parallel to one another prior to the final securing of the optical components so that a defined initial position of the optical components is given after their attachment to the arrangement, e.g. by snapping-on. The capacitive sensors fields or sensor areas at the inner faces of the optical components or the extension, respectively, but also of the rings or plates can be generated by sputtering, vapour deposition, or cluster deposition.

With the introduced arrangement, the invention unites optimum sensorics which is inherent with the system and does not require any additional installation space or detrimentally influences the desired properties of the optical components with a straight-forward temperature-compensated design. Specifically and with respect to the latter aspect, previously required multi-layer intermediate coatings have been omitted, which are disadvantageous not only because of temperature stability considerations but, in addition, involve higher technological expenditures.

BRIEF DESCRIPTION OF THE DRAWINGS

The invention will be explained in the following in greater detail by means of an embodiment and with reference to figures, in which.

DESCRIPTION OF THE PREFERRED EMBODIMENTS

An arrangement with two opposite annular rings 1 which are held at a spaced relationship to each other via bolts 2 is assumed in the embodiment according to the figures. The bolts 2 comprise an integrated solid joint 3.

In fact, the bolts 2 are arranged spaced by 120° and circumferentially in a distributed manner on the annular rings 1 and connecting same. The annular rings 1, but also the bolts 2, can be made by machining, wire erosion, or by laser machining. The individual components can be connected by joining in a manner known per se, with there being the possibility to manufacture the entire guide unit integrally, i.e. monolithically.

Figure 1:
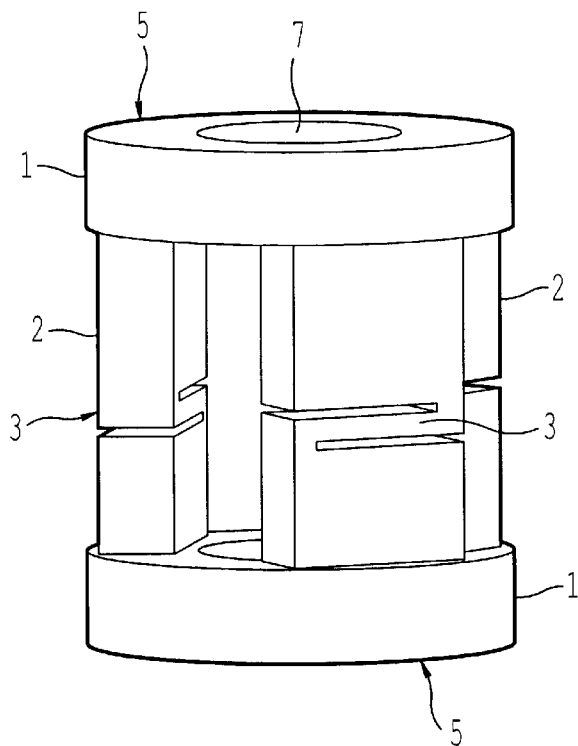
FIG. 1 shows a guide unit, comprising two annular rings which are connected with each other via solid joints.
Figure 2:
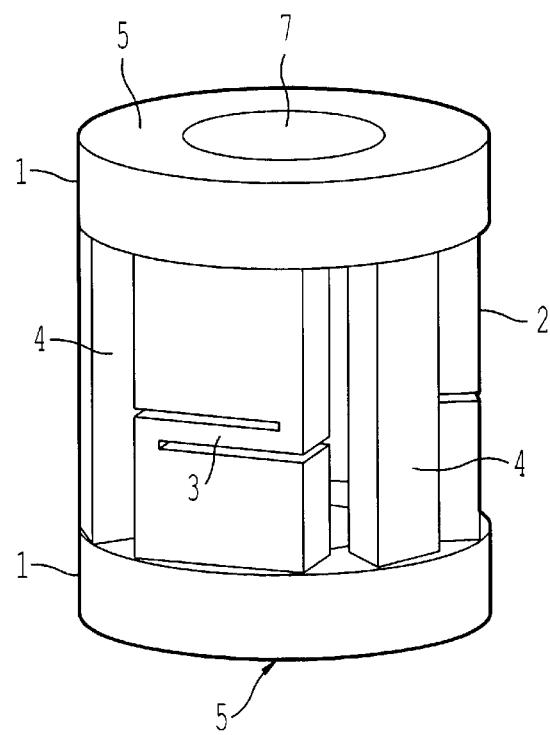
FIG. 2 is a representation of the guide unit, however, with already secured piezo actors.

The guide unit which has been pre-manufactured in this manner according to FIG. 1 is then completed with piezo actors 4, e.g. so-called stack-type actors, according to FIG. 2. The piezo actors 4 are arranged between the bolts 2, i.e. alternating with same, and preferably equally spaced. Expanding motions of the piezo actors 4 in the direction of their longitudinal axes result in a controlled force application onto the annular rings with a reproducible positional change.

The outer faces 5 of the annular rings 1 are coated with the same material from which the optical components to be attached are made. Such a coating can be performed by sputtering, vapour deposition, or similar methods. An adequate adhesion of the coating is ensured in that the thermal coefficients of expansion of the corresponding materials of the guide unit and the optical components are compatible with one another.

In the embodiment, the optical components consist of quartz and the guide unit consists of Invar. The coating layer is also made from quartz. With the coating step completed, the faces 5 are polished or ground plane-parallel to an optical quality so that the optical components 6 shown in FIGS. 3 and 4 can be secured e.g. by snapping-on.

Figure 3:
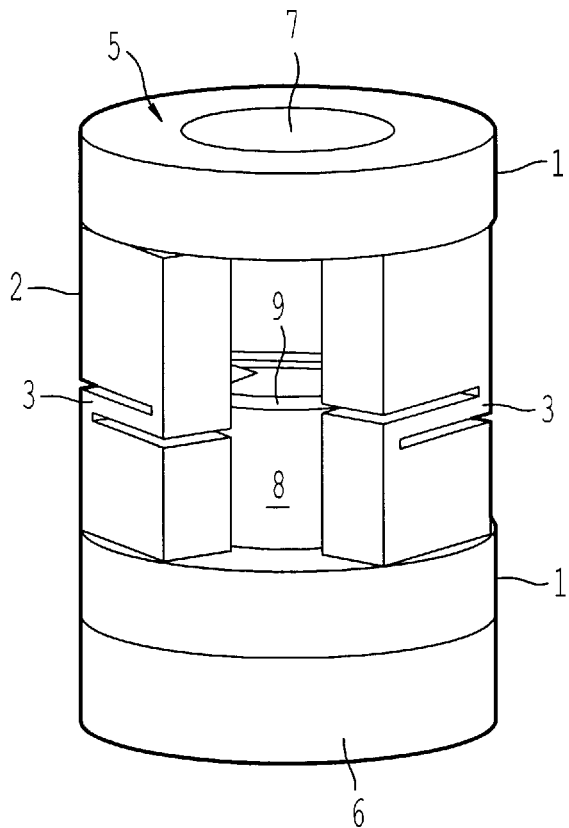
FIG. 3 is a representation of the guide unit with an optical component which, at an inner extension, comprises sensor areas for forming a capacitive range measuring probe.
Figure 4:
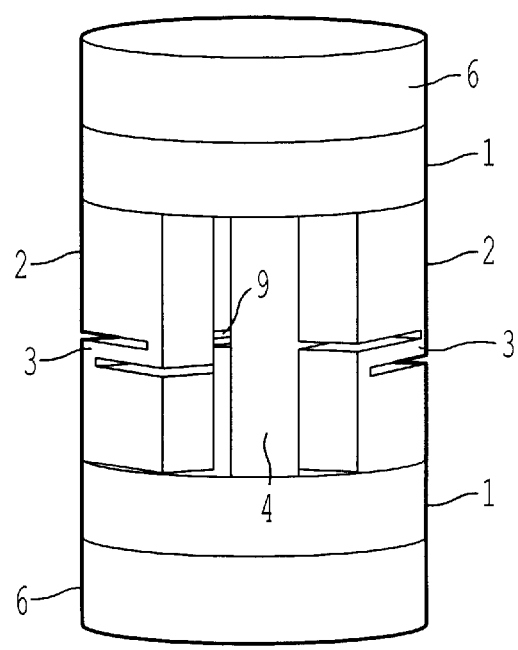
FIG. 4 shows a complete arrangement with two optical components, each of which secured at the faces of the annular rings, and inner sensor areas arranged opposite each other.

As can be seen from FIGS. 3 and 4, an extension 8 of the respective optical components protrudes into the opening 7 of the annular rings 1. At the opposite areas 9 of the extension 8, metal areas or metallic or conductive fields, respectively, are arranged or applied which form range measuring capacitors.

Preferably, three fields in a 120° arrangement are formed. After the electrical contacting of the areas these are utilised as capacitive sensors as illustrated in order to determine the exact position of the faces of the optical components relative to one another so that subsequently the measuring values can be used for individually controlling the piezo actors 4 in order to adjust the face distance e.g. highly parallel.

Alternatively or additionally, capacitive sensors can also be arranged on the inner surfaces of the annular rings 1, with only the constructional dimensions and the feasible distances of opposite capacitor areas being decisive.

What is claimed is:

1. An arrangement for a temperature-compensated multi-dimensional micropositioning of mutually position-defined optical components, comprising:

a guide unit for housing the optical components and a plurality of piezo actors, said guide unit including two spaced plates or rings;

three equally spaced solid joints arranged or integrated between the rings or plates;

stack-type piezo actors secured in a neighbouring relationship with the solid joints in such a manner that actuation forces act on the rings or plates, wherein at least surfaces of the rings or plates accommodating the optical components are coated with a material corresponding to that of the optical components, wherein the guide unit and the optical components are made from materials with essentially the same temperature coefficients, and wherein one stack-type piezo actor is arranged between two solid joints.

2. The arrangement according to claim 1, wherein inner surfaces of the plates or rings comprise a plurality of distributed conductive areas each of which forms capacitive sensors for the detection of at least one of the location and positional variations.

3. The arrangement according to claim 1, wherein the plates or rings each have an essentially central opening or through-hole, with a respective rear side or an extension of the optical component facing the arrangement covering or passing the opening, and at the rear side or the face of the extension, a plurality of distributed conductive areas are arranged which, together with opposite areas form capacitive range sensors each.

4. The arrangement according to claim 1, wherein the plates or rings and the guide unit comprise a monolithic body.

5. The arrangement according to claim 1, wherein the plates or rings and the guide unit include Invar, and the optical components and the coating include quartz.

6. The arrangement according to claim 2, wherein control signals for the stack-type piezo actors are derived from said at least one of the location and positional variation values of the capacitive sensors.

7. The arrangement according to claim 1, wherein the solid joints and the stack-type piezo actors each are arranged or secured in an alternating manner spaced by 120° between the plates or rings.

8. The arrangement according to claim 1, wherein the plates or rings are held via a bolt-type mechanism in a mutually spaced relationship and the solid joints each are integrated in the bolts.

9. The arrangement according to claim 1, wherein the stack-type actors are individually controllable.

* * * * *

UNITED STATES PATENT AND TRADEMARK OFFICE
CERTIFICATE OF CORRECTION

PATENT NO.    : 6,534,760 B2
DATED         : March 18, 2003
INVENTOR(S)   : Mueller et al.

It is certified that error appears in the above-identified patent and that said Letters Patent is hereby corrected as shown below:

<u>Title page,</u>
Item [73], Assignee, should read:
-- [73] Assignee: Physik-Instrumente (PI) Gmbh & Co. KG, Waldbronn (DE) --

Signed and Sealed this

Fifth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,534,760 B2
DATED : March 18, 2003
INVENTOR(S) : Mueller et al.

It is certified that error appears in the above-identified patent and that said Letters Patent is hereby corrected as shown below:

<u>Title page,</u>
Item [73], Assignee, should read:
-- [73] Assignee: Physik-Instrumente (PI) GmbH & Co. KG, Waldbronn (DE) --

This certificate supersedes Certificate of Correction issued August 5, 2003.

Signed and Sealed this

Thirteenth Day of July, 2004

JON W. DUDAS
*Acting Director of the United States Patent and Trademark Office*